United States Patent [19]

Spicer et al.

[11] 3,833,136
[45] Sept. 3, 1974

[54] DETACHABLE FRONT END LOADER

[75] Inventors: Dalton Harold Spicer, Welland;
George Francis Perdue, Lowbanks;
William Roderick MacGregor,
Welland, all of Ontario, Canada

[73] Assignee: Deere & Company, Moline, Ill.

[22] Filed: July 3, 1972

[21] Appl. No.: 268,434

[52] U.S. Cl. .............................. 214/131 A, 214/515
[51] Int. Cl. ............................................... B66f 9/04
[58] Field of Search ....... 214/131 A, 350, 357, 354, 214/355, 356, 515, 77 R

[56] References Cited
UNITED STATES PATENTS

| | | | |
|---|---|---|---|
| 841,404 | 1/1907 | Jay | 214/357 |
| 1,924,885 | 8/1933 | Schreck | 214/350 |
| 2,138,485 | 11/1938 | Faries | 214/350 |
| 3,184,082 | 5/1965 | Hall | 214/77 R |
| 3,612,311 | 10/1971 | Eidy | 214/131 A |

*Primary Examiner*—Robert J. Spar
*Assistant Examiner*—John Mannix

[57] ABSTRACT

A front end loader adapted for releasable attachment to an agricultural tractor and having apparatus for facilitating removal of the loader from the tractor and for supporting the loader when so removed, the apparatus including an upright, rigid are pivotally connected at its lower end to the tractor frame and at its upper end to the loader arm, the arm extending upwardly and rearwardly from its lower to its upper pivotal connection and being swingable forwardly relative to the tractor as the latter is moved rearwardly relative to the loader, whereby the arm is operative to raise and then lower the loader as the tractor is moved rearwardly. A U-shaped parking stand is pivotally connected to the loader for movement between a raised inoperative position and a lowered operative position, the stand in the latter position being operative to engage the ground and support the loader relative thereto as the loader is lowered by the arm.

13 Claims, 5 Drawing Figures

DETACHABLE FRONT END LOADER

BACKGROUND OF THE INVENTION

The present invention relates generally to a front end loader adapted for releasable attachment to a tractor and more particularly to apparatus for facilitating removal of the loader from the tractor and for supporting the loader relative to the ground when so removed.

Front end loaders designed for use with agricultural tractors are conventionally adapted to be removed from the tractor so that the latter can be utilized to perform other tasks. Various devices have been employed in the past to facilitate the removal of the loader from the tractor and to support the rear portion thereof when it is removed. A common apparatus of this type consists of a pair of L-shaped stands connectible to opposite sides of the loader rear support structure to extend transversely outwardly from the tractor beyond the front wheels thereof and then downwardly to ground-engaging lower ends. When the loader is disconnected from the tractor, the stand assumes the support of the rear portion of the loader and the tractor can be backed away therefrom, the front wheels of the tractor passing between the vertical portions of the stand. Although functionally adequate, the use of such stands is somewhat inconvenient where it is desired to remove the loader from the tractor at different locations, since the stands must be transported to each such location.

To overcome the latter problem, loaders have been developed with self-contained rear support means. Examples of such loaders are those disclosed in U.S. Pat. Nos. 3,612,311 issued Oct. 12, 1971 to Eidy et al.; 3,610,450 issued Oct. 5, 1971 to Demkiv; and 3,324,954 issued June 13, 1967 to Westendorf. The loaders disclosed in the two patents last mentioned utilize the loader hydraulic lift cylinders to tilt the loader frame to a generally vertical position wherein it is operative to act as a stand to support the rear portion of the loader, the frame being repositioned on the tractor with the aid of guide members fixed to the front of the tractor. A problem inherent in apparatus of this type is that resulting from the fact that when supported independently of the tractor, the loader hydraulic lift cylinders are extended and the piston rods thereof are thus exposed and susceptible to corrosion. The loader disclosed in the first-mentioned patent employs a guide member on the tractor for guiding the loader frame horizontally across the front axle of the tractor as the latter is backed away from the loader, and a separate parking stand pivotally mounted on the loader frame to swing downwardly to a ground-engaging position. Apparatus of this type is not adaptable for use, however, with a loader having a rear support structure extending below the tractor front axle, since the support structure would interfere with the axle on attempted removal of the loader from the tractor.

SUMMARY OF THE INVENTION

Accordingly, it is the primary object of the invention to provide improved apparatus for facilitating the removal of a detachable front end loader from a tractor.

It is another object to provide such apparatus having means for supporting the rear portion of the loader relative to the ground following its removal from the tractor.

It is another object to provide such apparatus which is carried by the tractor when the loader is attached thereto.

It is yet another object to provide such apparatus which includes means for raising the rear portion of the loader up and over the tractor front axle in response to movement of the tractor rearwardly relative to the loader.

It is yet a further object to provide such apparatus characterized by its simplicity, ease of operation, and economy of manufacture.

In pursuance of these and other objects, the invention comprises, generally, an upright, rigid arm pivotally connected at $x$ its lower end to the tractor frame and at its upper end to the $xxx$ rear portion of the loader, the arm being swingable about its lower pivotal connection as the tractor is moved rearwardly relative to the loader from an initial position wherein the arm is inclined upwardly and rearwardly from its lower pivotal connection, to an intermediate position wherein the arm extends directly upwardly from its lower pivotal connection, and to a final position wherein the arm extends forwardly from its lower pivotal connection. As the tractor is backed away from the loader, the arm is thus operative to first raise and then lower the rear portion of the loader relative to the tractor. A U-shaped parking stand is pivotally connected at a point rearwardly on the loader for swinging movement between a generally forwardly extending inoperative position and a generally downwardly extending operative position, the lower end of the stand in the latter position being operative to engage the ground and support the loader relative thereto as the loader is lowered by the arm. In its inoperative position, the U-shaped stand includes a bight portion extending transversely across the front of the tractor and a pair of sides extending rearwardly along opposite sides of the tractor over the front axle to rear end portions pivotally connected to the loader at points spaced rearwardly from the axle.

In preparation for removal of the loader from the tractor, the stand is released from its stored, inoperative position and swung downwardly into engagement with the tractor axle. As the tractor is moved rearwardly relative to the loader and the latter is raised by the swinging arm, the stand becomes free to hang directly downwardly from its pivotal connection, the lower end of the stand being spaced from the ground when the loader is raised to its maximum height by the arm. As the tractor continues to back away from the loader and the arm thus lowers the latter relative to the former, the stand engages the ground and assumes the support of the rear portion of the loader.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
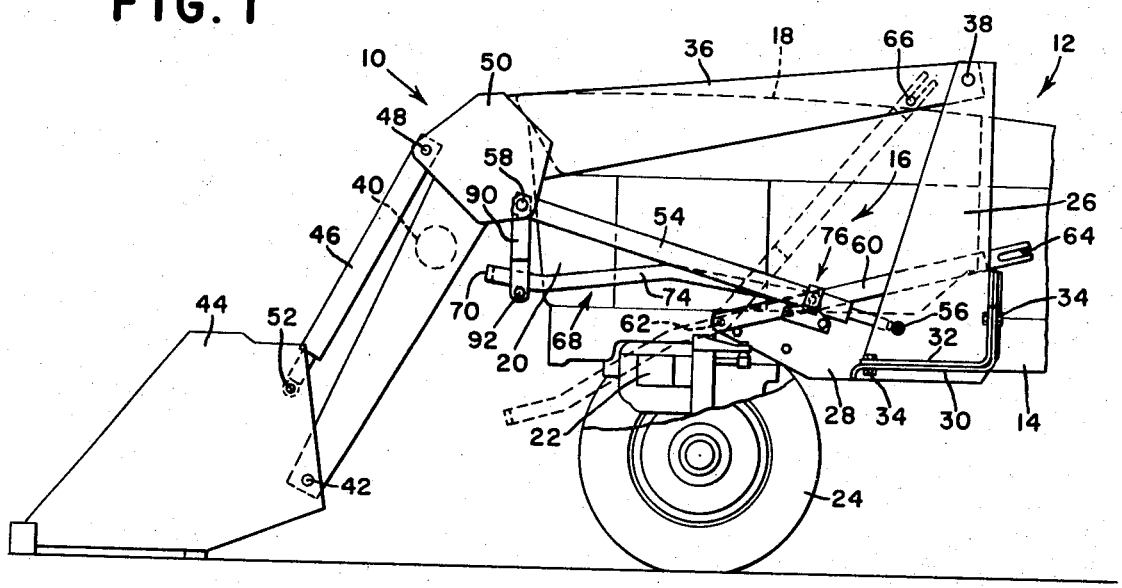
FIG. 1 is a left side elevational view of a front end loader incorporating the principles of the invention, in which dotted lines are used to show the positions to which certain elements are moved in preparation for removing the loader from the tractor.

Referring now to the drawings, there is illustrated a front end loader designated generally by the numeral 10 adapted for releasable attachment to a conventional agricultural tractor shown fragmentarily at 12. The tractor 12 includes a longitudinally elongated frame 14, an engine mounted on the frame within an enclosure designated generally at 16, a hood portion 18 extending over the engine, and a front grille member 20. A front axle 22 is connected to the frame 14 and extends transversely therebeneath and outwardly from the sides of the tractor, each end of the axle having a steerable wheel 24 mounted thereon in a conventional manner.

The loader 10 is generally symmetrical about a longitudinal vertical plane and includes a pair of vertical support structures 26 releasably mountable on opposite sides of the tractor frame 14. A pair of vertical plates 28 are bolted to the sides of the tractor frame 14 generally rearwardly of the axle 22 and have L-shaped plates 30 fixed thereto and extending outwardly therefrom to form a pair of platforms for the loader support structures 26. The structures 26 have matching L-shaped plates 32 fixed to their lower ends, the plates 32 being releasably connectible to the plates 30 by means of bolts 34. As is apparent from FIG. 1 of the drawings, the lower ends of the support structures 26, when the latter are secured to the tractor-mounted plates 30, are disposed below the top side of the axle 22.

A downwardly and forwardly extending loader frame arm 36 is pivotally connected to the upper end of each of the support structures 26 by means of a transverse pin 38, the arms being rigidly interconnected by means of a tube 40 extending transversely between the arms 36 forwardly of the tractor grille member 20. Attached to the lower end of the arms 36 by means of pivot pin 42 is a bucket 44, the angle of the latter about the axis of the pin 42 being controllable by means of a pair of hydraulic cylinders 46. Each cylinder 46 acts between a pin 48 extending between a pair of plates 50 fixed to opposite sides of an intermediate portion of the arm 36, and a pin 52 on one side of the bucket rear wall. Hydraulic fluid under pressure from a source on the tractor is introduced into the cylinders 46 through means not shown to effect extension and retraction thereof and to thereby swing the bucket about the axis of the pin 42. Another pair of hydraulic cylinders 54 act between pins 56 on the lower ends of the support structures 26, and pins 58 extending between each set of plates 50, the cylinders 54 being extensible and retractable to swing the arms 36 vertically about the pins 38 on the support structures 26. Hydraulic fluid from the tractor hydraulic system is introduced into the cylinders 54 through means not shown to effect such extension and retraction.

Figure 4:
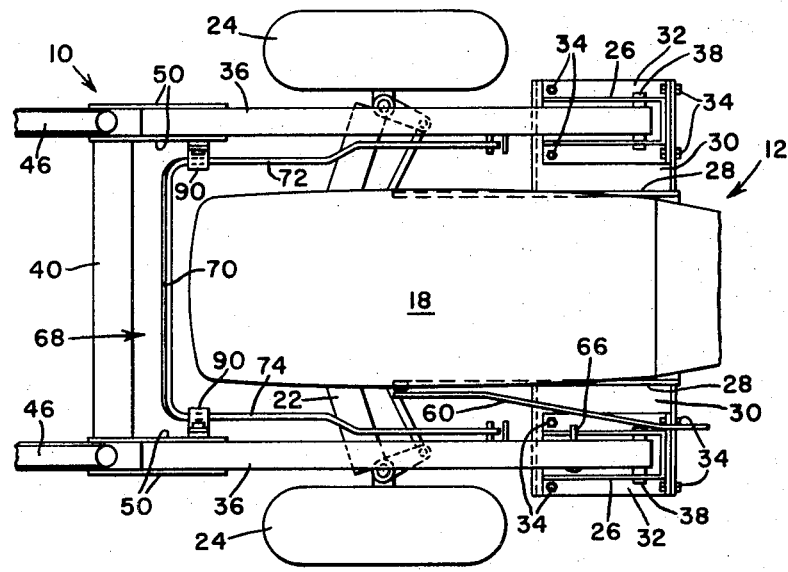
FIG. 4 is a fragmentary plan view of the loader attached to the tractor.

A rigid arm 60, to facilitate removal of the loader 10 from the tractor 12, is pivotally connected at 62 to the forward end of the plate 28 secured to the left side of the tractor frame 14. An elongated, outwardly opening slot 64 is formed in the outer end of the arm for a purpose that will be described. When the loader is attached to the tractor, the arm 60, as shown in FIG. 4 and the solid line position in FIG. 1, extends rearwardly from the connection 62 and rests on the upper edge of the L-shaped member 30 fixed to the plate 28. In preparation for removal of the loader from the tractor, the arm is raised to the upwardly and rearwardly extending position shown in dotted lines in FIG. 1, with the slot 64 receiving the inner end portion of a pin 66 in the upper rear portion of the left frame arm 36.

Figure 3:
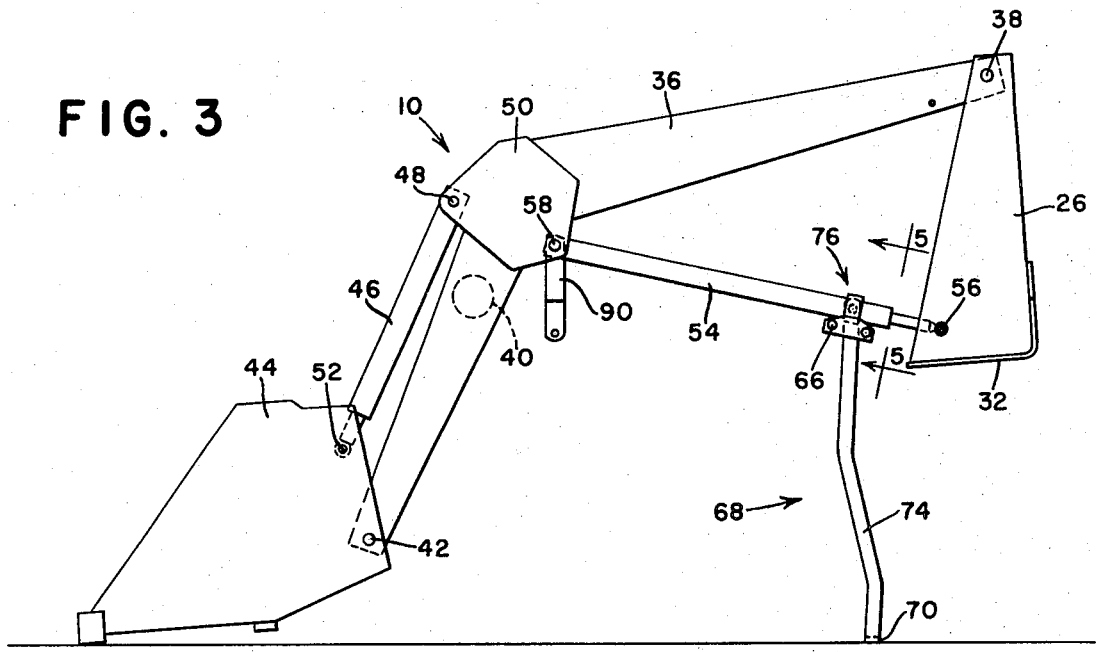
FIG. 3 is a left side elevational view of the loader removed from the tractor and supported on its self-contained stand.
Figure 5:
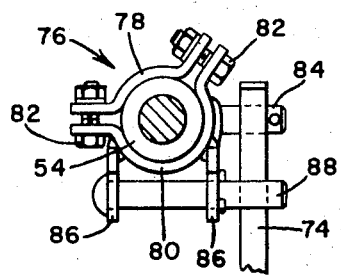
FIG. 5 is a sectional view taken along the line 5—5 of FIG. 3.

A generally U-shaped stand 68, including a bight portion 70 and right and left leg portions 72 and 74, respectively, is pivotally mounted on the hydraulic cylinders 54 for swinging movement between a raised inoperative position shown in FIG. 4 and in solid lines in FIG. 1, and a lowered operative position shown in FIG. 3. The outer ends of the leg portions 72 and 74 are pivotally connected to the lower ends of the cylinders 54 by means of brackets 76, the left one of which is shown in detail in FIG. 5. The bracket illustrated, which is identical to the bracket mounted on the right cylinder 54, comprises a pair of arcuate members 78 and 80 clamped together around the outer surface of the cylinder 54 by means of bolts 82, the arcuate member 80 having a pin 84 fixed to its side and extending inwardly to pivotally receive the end of the leg 74. Also fixed to the arcuate member 80, and extending downwardly therefrom, are a pair of spaced plates 86 having front and rear, transversely aligned apertures therein. Received in the rear aperture and extending inwardly from the inner plate 86 is a stop pin 88, the purpose of which will be subsequently described.

When the loader is attached to the tractor as shown in FIGS. 1 and 4, the stand 68 is retained in its raised inoperative position by means of hanger straps 90, one of which is suspended from each of the cylinder mounting pins 58 in the plates 50. Each strap 90 has a bifurcated lower end adapted to receive one of the legs of the stand 68. A removable pin 92 is receivable in aligned apertures in the bifurcated end to retain the stand in its raised position. In preparation for removal of the loader from the tractor, the pins 92 are removed from the hanger straps 90 to release the stand 68 from its raised position, and the latter is lowered to the dotted line position shown in FIG. 1 wherein the legs 72 and 74 of the stand rest on the outer ends of the front axle 22.

The procedure for removing the loader 10 from the tractor 12 will now be described. As already mentioned, the arm 60 and stand 68 are moved from their solid line positions to their dotted line positions of FIG. 1 in preparation for removal of the loader. In addition, the four bolts 34 securing each of the vertical support structures 26 to the tractor-mounted L-shaped plates 30 are removed. Next, the tractor is backed away from the detached loader, causing the arm 60 to swing upwardly to the vertical position shown in FIG. 2. As is apparent from this figure, the rear portion of the loader is raised by the arm 60 relative to the tractor so that the lower ends of the support structures 26 are disposed above the front axle 22. In addition, the stand 68 is disposed to hang freely from its pivotal connections with the loader, the bight portion 70 of the stand being spaced from the ground. Due to the location of the offset bends in the legs 72 and 74 of the stand, the bight portion 70 is disposed slightly rearwardly from the pins 84 when the stand 68 hangs freely therefrom.

Figure 2:
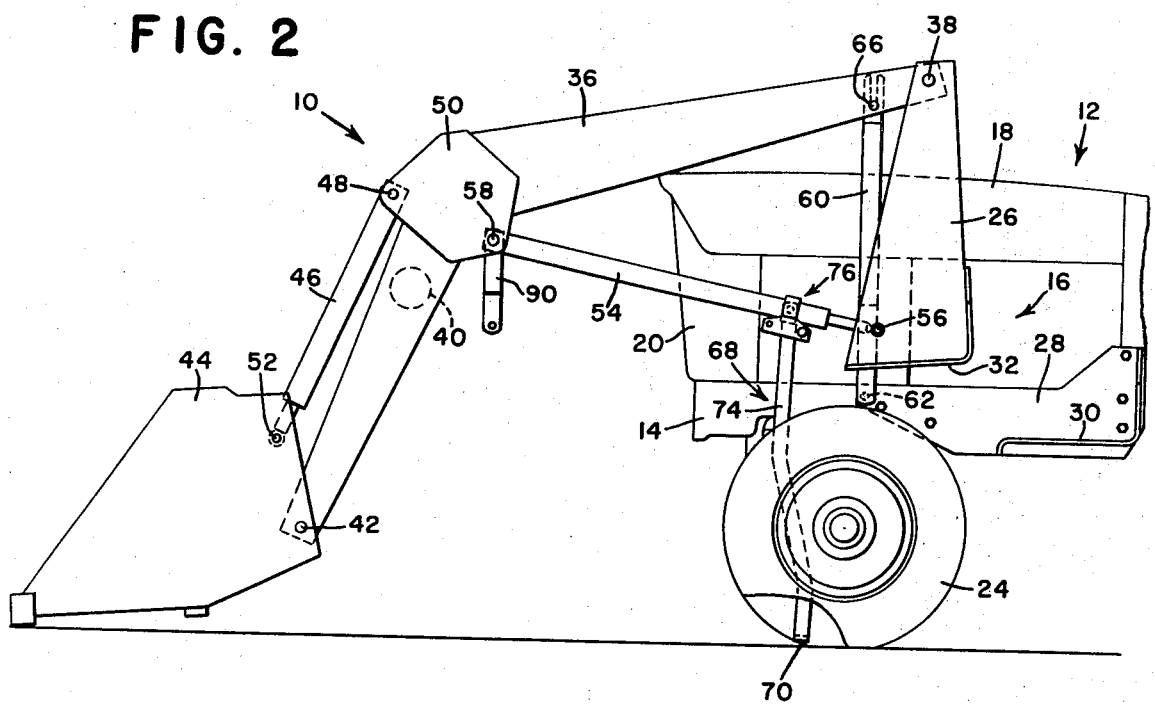
FIG. 2 is a left side elevational view of the loader illustrating an intermediate position assumed thereby as the tractor is moved rearwardly during the removal operation.

Continued rearward movement of the tractor causes the arm 60 to swing forwardly of its pivotal connection 62 with the tractor, the arm thereby lowering the rear portion of the loader from its maximum height position shown in FIG. 2. As the loader is lowered, the bight portion 70 of the stand 68 engages the ground as shown in FIG. 3 and the stand thus assumes the support of the loader. Continued rearward movement of the tractor causes the arm 60 to disengage the pin 66 in the loader frame arm 36, the open ended slot 64 in the arm permitting such disengagement.

Since the lower end or bight portion of the stand 68 rests on the ground at a point rearwardly from the pivotal connection 84 between the stand and loader, the latter is in a stable condition when in its self-supporting position shown in FIG. 3. The stop pins 88 in the brackets 76 prevent rearward movement of the stand 68 about the pins 84. To prevent accidental movement of the stand from its stable position, however, the pin 66 is removed from the loader frame arm 36 and replaced in the forward set of aligned apertures in the plates 86 of the left bracket 76, the pin 66 thereby being operative to prevent forward movement of the stand about the pins 84.

The procedure for mounting the loader on the tractor involves essentially a reversal of the foregoing steps. The tractor is first driven forwardly to a position just rearwardly of the loader and the arm 60 is swung upwardly and engaged by the inner end of the pin 66, which is removed from the plates 86 and reinserted in the loader frame arm 36. Forward movement of the tractor relative to the loader is continued, causing the arm 60 to swing upwardly and rearwardly about its pivotal connection 62, which in turn raises the rear portion of the loader above the tractor axle 22 to the position shown in FIG. 2. At this point, the rear portion of the loader is supported by the arm 60 and the stand 68 is raised clear of the ground. Continued forward movement of the tractor causes the arm 60 to swing downwardly and rearwardly about the connection 62, thereby lowering the loader into place on the tractor-mounted plates 30. Such continued movement of the tractor causes the front axle 22 thereof to engage the legs 72 and 74 of the stand 68 and thereby raise the latter to the dotted line position of FIG. 1.

Attachment of the loader to the tractor is completed by replacing the bolts 34 which secure the vertical support structures 26 to the tractor-mounted plates 30, and returning the arm 60 and stand 68 to their solid line positions of FIG. 1, the latter being retained by means of pins 92 reinserted in the hanger straps 90.

We claim:

1. In combination with a tractor having a frame and a loader adapted for releasable attachment to said frame, means for facilitating removal of the loader from the tractor and supporting the rear portion of the loader when so removed, comprising: an upright, rigid arm pivotally connected at its lower end to the tractor frame and at its upper end to the rear portion of the loader, said arm being swingable about its lower pivotal connection as the tractor is moved rearwardly relative to the loader from an initial position wherein said arm is inclined upwardly and rearwardly from said lower pivotal connection, to an intermediate position wherein said arm extends directly upwardly from said lower pivotal connection, and to a final position wherein said arm extends forwardly from said lower pivotal connection, whereby said arm is operative to first raise and then lower the rear portion of said loader relative to the tractor as the latter is moved rearwardly relative to the loader; and parking stand means connected to the loader for movement between operative and inoperative positions, the stand in the former position being operative to engage the ground and support the rear portion of the loader relative thereto as the loader is lowered by said arm.

2. The invention defined in claim 1 wherein the stand is pivotally connected to the loader for movement between a raised inoperative position and a lowered operative position, the lower end of the stand in the latter position being spaced from the ground and said stand being disposed to hang freely from its pivotal connection with the loader when the latter is raised to its maximum height by said arm.

3. The invention defined in claim 2 wherein the lower end of said stand is disposed rearwardly from the pivotal connection between the stand and loader when the stand is disposed to hang freely from its pivotal connection with the loader.

4. The invention defined in claim 1 wherein said tractor includes a front axle extending transversely beneath the frame; wherein said loader includes vertical support structure disposed rearwardly of said axle and having a lower end extending below the top side of said axle when the loader is attached to said frame; and wherein the lower end of said support structure is raised to a position directly above and in spaced relation to the top side of said axle by said arm as the tractor is moved rearwardly relative to the loader.

5. The invention defined in claim 1 wherein the stand comprises a U-shaped member pivotally mounted on the loader for movement between a raised inoperative position and a lowered operative position, said U-shaped member in the former position and when the loader is attached to the tractor having a bight portion extending transversely across the front of the tractor and having side portions extending longitudinally along the sides of the tractor to rear end portions pivotally connected to the loader.

6. The invention defined in claim 5 including means for releasably retaining the stand in its raised inoperative position, said means being releasable to permit said stand to pivot downwardly about its pivotal connection with the loader.

7. The invention defined in claim 5 wherein the tractor includes a front axle extending transversely beneath the frame; and wherein the side portions of the U-shaped member extend longitudinally above said axle to rear end portions spaced rearwardly from said axle.

8. The invention defined in claim 7 including means for releasably retaining the stand in its raised inoperative position, said means being releasable to permit said stand to pivot downwardly about its pivotal connection with the loader, and wherein said axle is engageable with the side portions of said stand to limit its downward movement when the loader is attached to the tractor.

9. The invention defined in claim 8 wherein the pivotal connections between the side portions of the U-shaped member and the loader are disposed forwardly of said axle when the loader is raised to its maximum height relative to the tractor by the arm, whereby the U-shaped member is disposed to hang vertically downwardly from its pivotal connections with the loader forwardly of said axle.

10. The invention defined in claim 9 wherein the bight portion of said U-shaped member is spaced vertically from the ground when the member is disposed to hang vertically downwardly from its pivotal connections with the loader forwardly of said axle, said bight portion being engageable with the ground to support the rear portion of the loader relative thereto as the loader is lowered by said arm.

11. For use in combination with a tractor having a frame and a loader having a front end ground-engaging bucket and frame structure projecting rearwardly therefrom adapted for releasable connection to and disconnection from said frame, means for facilitating removal of the loader from the tractor when the loader framework is disconnected comprising: a rigid arm adapted for pivotal connection at one end to the tractor frame and at its other end to the rear portion of the loader framework, said arm being swingable forwardly about its pivotal connection with the frame as the tractor is moved rearwardly relative to the loader from an initial position wherein said arm is inclined upwardly and rearwardly from its pivotal connection with the frame, to an intermediate position wherein said arm extends directly upwardly from its pivotal connection with the frame, and to a final position wherein said arm extends forwardly from its pivotal connection with the frame, whereby said arm is operative to first raise and then lower the rear portion of the loader framework relative to the tractor as the latter is moved rearwardly relative to the loader.

12. The invention defined in claim 11 including parking stand means adapted for mounting on the rear portion of the loader framework and movable between a raised inoperative position and a lowered operative position, the stand in the latter position being operative to engage the ground and support the rear portion of the loader framework relative thereto as the arm moves from its intermediate to its final position to lower the rear portion of the loader framework relative to the tractor.

13. The invention defined in claim 11 wherein the pivotal connection between the arm and the rear portion of the loader framework comprises a pin on the loader and an elongated, pin-receiving slot formed in the arm and opened at the upper end thereof whereby said arm is disengageable from said pin as the tractor is moved rearwardly relative to the loader.

* * * * *